(12) United States Patent
Lee

(10) Patent No.: US 11,245,544 B2
(45) Date of Patent: Feb. 8, 2022

(54) INTELLIGENT WASHING MACHINE AND METHOD FOR CONTROLLING WASHING TIMING USING THE SAME

(71) Applicant: LG Electronics Inc., Seoul (KR)

(72) Inventor: Myunghee Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 31 days.

(21) Appl. No.: 16/588,450

(22) Filed: Sep. 30, 2019

(65) Prior Publication Data

US 2020/0024792 A1 Jan. 23, 2020

(30) Foreign Application Priority Data

Sep. 2, 2019 (KR) .......................... 10-2019-0107976

(51) Int. Cl.
| | | |
|---|---|---|
| B08B 3/02 | (2006.01) | |
| H04L 12/28 | (2006.01) | |
| D06F 39/00 | (2020.01) | |
| D06F 35/00 | (2006.01) | |
| G06N 3/08 | (2006.01) | |
| D06F 33/44 | (2020.01) | |
| D06F 34/18 | (2020.01) | |
| D06F 103/00 | (2020.01) | |
| D06F 103/04 | (2020.01) | |
| D06F 103/06 | (2020.01) | |
| D06F 103/38 | (2020.01) | |
| D06F 105/50 | (2020.01) | |
| D06F 105/52 | (2020.01) | |

(Continued)

(52) U.S. Cl.
CPC .......... *H04L 12/2825* (2013.01); *D06F 33/44* (2020.02); *D06F 35/006* (2013.01); *D06F 39/001* (2013.01); *G06N 3/08* (2013.01); *H04L 12/2818* (2013.01); *D06F 34/05* (2020.02); *D06F 34/18* (2020.02); *D06F 2103/00* (2020.02); *D06F 2103/04* (2020.02); *D06F 2103/06* (2020.02); *D06F 2103/38* (2020.02); *D06F 2105/50* (2020.02); *D06F 2105/52* (2020.02); *D06F 2105/58* (2020.02); *H04L 2012/285* (2013.01); *H04L 2012/2841* (2013.01)

(58) Field of Classification Search
None
See application file for complete search history.

(56) References Cited

U.S. PATENT DOCUMENTS

2012/0312055 A1* 12/2012 Fagstad .................. D06F 34/28
68/12.04

FOREIGN PATENT DOCUMENTS

JP 2005034180 A * 2/2005

OTHER PUBLICATIONS

EPO translation of JP2005034180A retrieved on Apr. 3, 2021 (Year: 2021).*

\* cited by examiner

*Primary Examiner* — Eric W Golightly
(74) *Attorney, Agent, or Firm* — Fish & Richardson P.C.

(57) ABSTRACT

According to an embodiment of the present invention, a method of controlling wash timing using an intelligent washer comprises determining to perform a wash, calculating a required time for the wash, predicting a return time of the user, and determining a start time of the wash to terminate the wash corresponding to the return time. According to an embodiment, the washer may be related to artificial intelligence (AI) modules, unmanned aerial vehicles (UAVs), robots, augmented reality (AR) devices, virtual reality (VR) devices, and 5G service-related devices.

11 Claims, 14 Drawing Sheets

(51) Int. Cl.
*D06F 105/58* (2020.01)
*D06F 34/05* (2020.01)

Prior Art

Prior Art

Prior Art

INTELLIGENT WASHING MACHINE AND METHOD FOR CONTROLLING WASHING TIMING USING THE SAME

CROSS-REFERENCE TO RELATED APPLICATIONS

This application is based on and claims priority under 35 U.S.C. 119 to Korean Patent Application No. 2019-0107976, filed on Sep. 2, 2019, in the Korean Intellectual Property Office, the disclosure of which is herein incorporated by reference in its entirety.

TECHNICAL FIELD

Embodiments of the disclosure relate to an intelligent washer and a method of controlling wash timing using the intelligent washer, and in particular, to an intelligent washer capable of controlling wash timing based on the user's return time and a method of controlling wash timing using the intelligent washer.

DESCRIPTION OF RELATED ART

Generally, washer or washing machine refers to an apparatus for processing laundry, e.g., clothing or bedding, by applying physical and/or chemical actions to the laundry. A washer includes an outer tub which contains wash water and an inner tub which receives laundry and is spinnable inside the outer tub. A typical washing method includes a wash cycle during which the inner tub spins to wash the laundry, a rinse cycle during which wash water is supplied to remove the detergent and used water, and a spin cycle during which the centrifugal force of the inner tub removes water from the laundry.

The wash cycle consumes a relatively long time and causes noise which may bother the user. If the user leaves home after starting the washer and, even after all the cycles are done, the laundry stays wet in the closed machine a long time, the laundry may smell.

SUMMARY

The present invention aims to address the foregoing issues and/or needs.

According to an embodiment, there are provided an intelligent washer which allows the user to avoid noise from the washer and a method of controlling wash timing using the intelligent washer.

According to an embodiment, there are provided an intelligent washer capable of preventing laundry from being neglected in the washer and a method of controlling wash timing using the intelligent washer.

According to an embodiment of the present invention, an intelligent washer and a method of controlling wash timing using the intelligent washer comprises determining to perform a wash, calculating a required time for the wash, predicting a return time of the user, and determining a start time of the wash to terminate the wash corresponding to the return time.

The wash may be determined to be performed when an amount of laundry in the washer is a preset threshold or more.

Calculating the required wash time may include determining the amount of laundry, obtaining laundry classification information for the laundry, and calculating the required wash time by learning the weight of the laundry and the laundry classification information.

Predicting the return time may include comparing the required wash time with a required return time and predicting the return time by learning accumulated return times when the required wash time is longer than the required return time.

Predicting the return time may include performing learning using real-time traffic information and global positioning system (GPS) information for the user as an input value of an artificial intelligence (AI) learning model when the required wash time is shorter than the required return time.

Predicting the return time may include performing learning using the GPS information matching a particular time per day, as the input value of the AI learning model.

Determining the wash start time may include performing learning using weight information for the laundry, the GPS information matching the particular time per day, and information for personnel in the user space, as the input value of the AI learning model.

The method may further comprise starting a wash at the determined wash start time, monitoring a variation in the predicted return time, and changing a wash condition when the variation in the predicted return time is a preset threshold or more.

Changing the wash condition may include, when the predicted return time comes later, performing a rinse cycle for a longer time.

Changing the wash condition may include, when the predicted return time comes earlier, performing a spin cycle for a shorter time.

Determining the wash start time may include receiving, from a network, downlink control information (DCI) used for scheduling transmission of information for the input value of the AI learning model. The information for the input value of the AI learning model may be transmitted to the network based on the DCI.

The method may further comprise performing an initial access procedure with the network based on a synchronization signal block (SSB). The information for the input value of the AI learning model may be transmitted to the network via a physical uplink shared channel (PUSCH). Dedicated demodulation reference signals (DM-RSs) of the SSB and the PUSCH may be quasi co-located (QCL) for QCL type D.

According to an embodiment of the present invention, an intelligent washer comprises a washing tub receiving laundry, a motor driving the washing tub, and a controller calculating a required wash time and determining to perform a wash according to the amount of the laundry received in the washing tub, predicting a return time of a user who is absent, and determining a start time of the wash to terminate the wash based on the return time.

The controller may calculate the required wash time by learning the weight of the laundry and laundry classification information.

The controller may predict the return time by learning accumulated return times when the required wash time is longer than a required return time.

The controller may perform learning using real-time traffic information and GPS information for the user as an input value of an AI learning model when the required wash time is shorter than the required return time.

The controller may predict the return time by performing learning using the GPS information matching a particular time per day, as the input value of the AI learning model.

The controller may determine a wash start time by performing learning using weight information for the laundry, the GPS information matching the particular time per day, and information for personnel in a user space matching the particular time per day, as the input value of the AI learning model.

The controller may monitor a variation in the return time after starting a wash at the wash start time and, when the variation in the return time is a preset threshold or more, changes a wash condition.

According to an embodiment of the present invention, an intelligent washer and a method of controlling wash timing using the intelligent washer provide the following effects.

According to the present invention, the intelligent washer performs a wash while the user is absent, freeing the user from washer noise.

According to the present invention, the wash end time is set to the user's return time, and this prevents the laundry from being neglected in the washer for a long time.

Effects of the present invention are not limited to the foregoing, and other unmentioned effects would be apparent to one of ordinary skill in the art from the following description.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
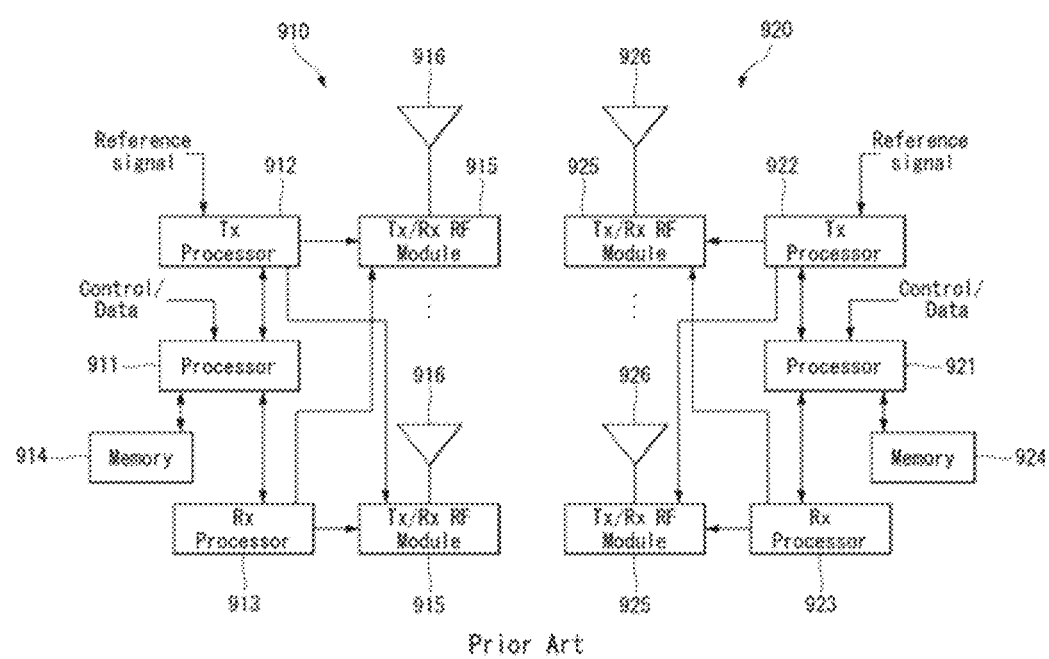
FIG. 1 is a block diagram of a wireless communication system to which methods proposed in the disclosure are applicable.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
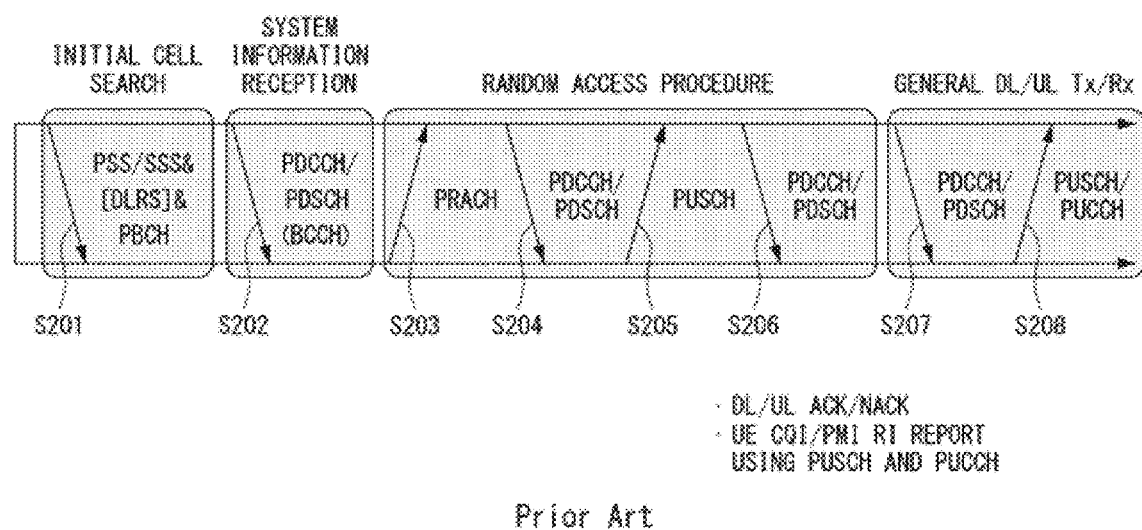
FIG. 2 shows an example of a signal transmission/reception method in a wireless communication system.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.
- The UE receives signals on resources in a CSI-RS resource set in which the RRC parameter 'repetition' is set to 'OFF' in different DL spatial domain transmission filters of the BS.
- The UE selects (or determines) a best beam.
- The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

- A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.
- The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.
- When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

Figure 3:
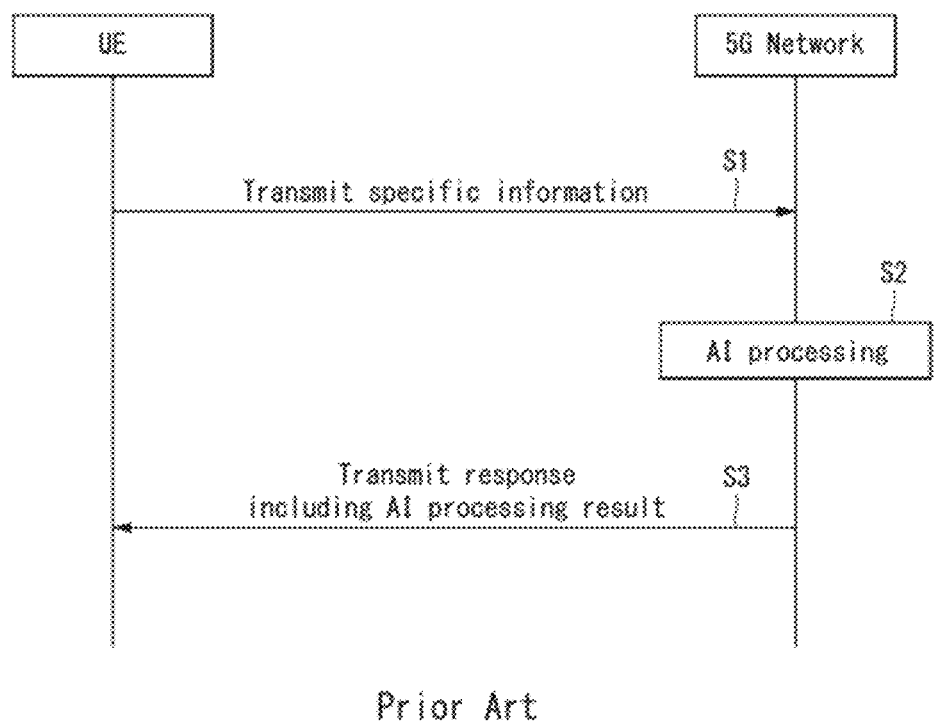
FIG. 3 shows an example of basic operations of an user equipment and a 5G network in a 5G communication system.

FIG. 3 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied Operations Between Autonomous Vehicle and 5G Network in 5G Communication System Hereinafter, the operation of an autonomous vehicle using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the autonomous vehicle performs an initial access procedure and a random access procedure with the 5G network prior to step S1 of FIG. 3 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present invention which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

Figure 4:
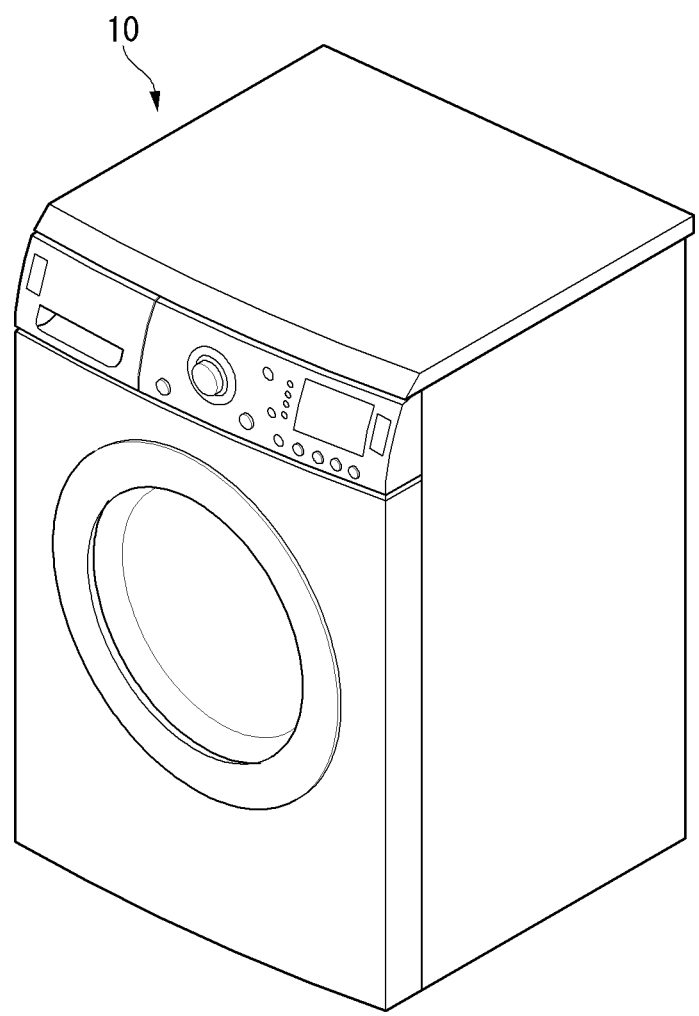
FIGS. 4 and 5 are views illustrating an intelligent washer according to an embodiment of the present invention.
Figure 5:
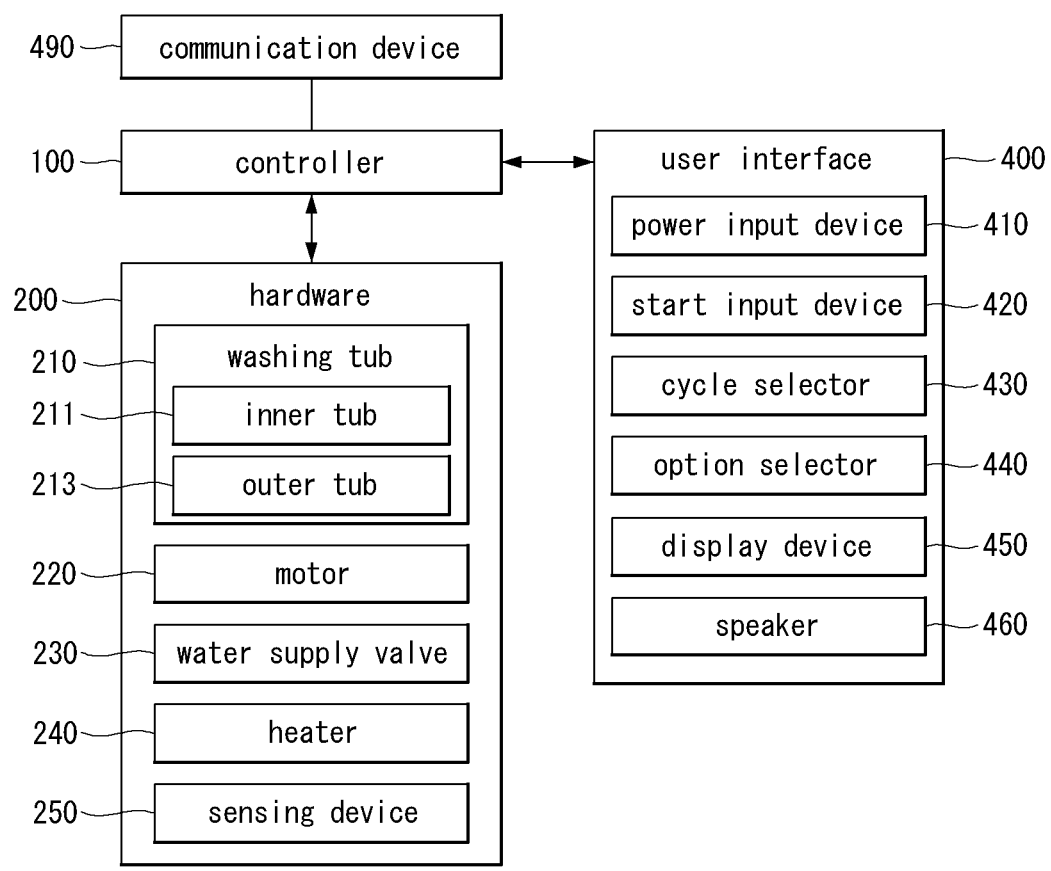

FIG. 4 is a view illustrating an intelligent washer according to an embodiment of the present invention. FIG. 5 is a block diagram illustrating major components of the washer of FIG. 4.

Referring to FIGS. 4 and 5, according to an embodiment, a washer 10 includes a controller 100, hardware 200, and a user interface 400.

The controller 100 controls the hardware 200 according to information input via the user interface 400, thereby controlling the overall operation of the washer 10. The controller 100 obtains information related to the dryness state of the laundry via a sensing device 250 included in the hardware 200 and obtains information related to the operation state of the washer 10 via a washing tub 210, a motor 220, or a heater 240. The controller 100 samples the obtained information and controls the operation of the hardware 200 based on the sampled information.

Specifically, the controller 100 may analyze laundry put and seated in an inner tub 211, thereby extracting sampling features related to the dryness of the laundry. More specifically, the sampling features include features related to the operation of the intelligent washer 10 and features related to the dryness of the laundry. The features related to the operation of the intelligent washer 10 include the revolutions per minute (RPM) of the inner tub 211, the current of the motor 220, and the heating temperature of the heater 240, and the features related to the dryness of the laundry include the water level of the water container of the intelligent washer 10, the humidity inside the inner tub 211, and the thermal infrared temperature distribution of the laundry.

The controller 100 may sample the features and calculate and predict a full dry remaining time that is a time necessary for fully drying the laundry put and seated in the inner tub 211.

The hardware 200 may include the washing tub 210, the motor 220, a water supply valve 230, the heater 240, and the sensing device 250. The sensing device 250 may include a camera for obtaining an image of the inside of the washing tub 210 and a weight sensor for measuring the weight of the laundry seated in the washing tub 210.

The washing tub 210 includes an outer tub 213 which contains wash water and the inner tub 211 which is disposed inside of the outer tub 213 to receive laundry and is spun by the rotating power received from the motor 220. The water supply valve 230 controls the supply of wash water. The heater 240 heats the water in the washing tub 210. The sensing device 250 detects the dryness state of the laundry seated in the inner tub 211.

The user interface 400 may include a power input device 410, a start input device 420, a cycle selector 430, an option selector 440, a display device 450, and a speaker 460.

The power input device 410 provides a means for controlling the on/off of the main power source of the washer 10. The start input device 420 provides a means for controlling the start of the wash cycle, rinse cycle, or spin cycle. The cycle selector 430 provides a means for selecting the type of the wash cycle, rinse cycle, or spin cycle. The option selector 440 provides a means for selecting detailed options to perform the wash, rinse, or spin cycle. For example, the option selector 440 may be a means for selecting options, such as water temperature, time, or reservation. The display device 450 may display the operation state of the washer 10, cycle information selected by the user via the cycle selector 430, option information selected via the option selector 440, or time necessary to fully dry the laundry. The speaker 460 outputs the operation state of the washer 10 or a circumstance for a particular event in a voice signal. The particular event may be a circumstance for laundry distribution control or RPM control based on a laundry image.

The communication device 190 may be configured as a communication device for Wi-Fi, Bluetooth, infrared radiation (IR), ultra-wideband (UWB), Zigbee, or other know short-range wireless communication or as a mobile communication device, such as for 3G 4G LTE, or 5G or the communication device 180 may alternatively be configured as a known communication port for wired communication.

Figure 6:
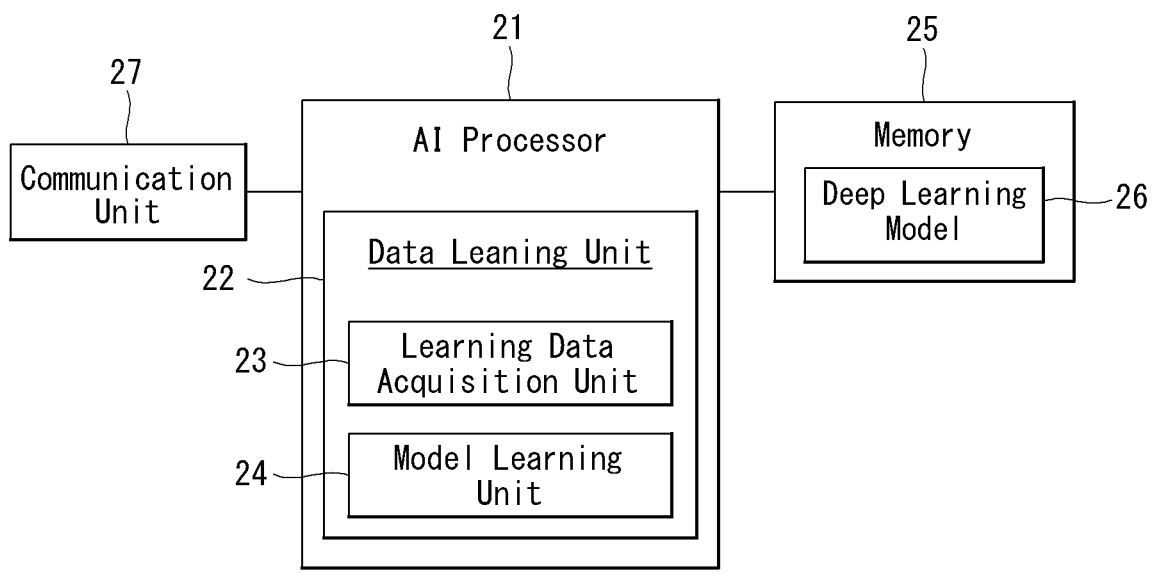
FIG. 6 is a block diagram of an AI device according to an embodiment of the present invention.

FIG. 6 is a block diagram illustrating an AI device according to an embodiment of the present invention.

Referring to FIG. 6, an AI device 20 may include an electronic device including an AI module capable of AI processing or a server including an AI module. The AI device 20 may be included as at least a component of the washer 10 of FIGS. 4 and 5 so that the AI device 20 may perform at least part of AI processing along therewith.

AI processing may include all operations related to the controller 100 of the washer 10 of FIG. 4. For example, the washer 10 perform AI processing the laundry image or laundry classification information or laundry distribution information, thereby performing processing/determination and generating control signals.

The AI device 20 may be a client device which directly uses the results of AI processing or a cloud-environment device which provides the results of AI processing to other devices. The AI device 20 may be a computing device capable of learning neural networks and may be implemented as at least one of various electronic devices, such as servers, desktop PCs, laptop computers, or tablet PCs.

The AI device 20 may include an AI processor 21, a memory 25, and/or a communication device 27.

The AI processor 21 may learn a neural network based on the program stored in the memory 25. In particular, the AI processor 21 may learn a neural network for recognizing relevant data of the washer 10. The neural network for recognizing the relevant data of the washer 10 may be designed to mimic the human brain on the computer and may include a plurality of weighted network nodes which mimic the neurons of the human neural network. The plurality of network nodes can transmit and receive data in accordance with each connection relationship to simulate the synaptic activity of neurons in which neurons transmit and receive signals through synapses. Here, the neural network may include a deep learning model developed from a neural network model. In the deep learning model, a plurality of network nodes is positioned in different layers and can transmit and receive data in accordance with a convolution connection relationship. The neural network, for example, includes various deep learning techniques such as deep neural networks (DNN), convolutional deep neural networks (CNN), recurrent neural networks (RNN), a restricted boltzmann machine (RBM), deep belief networks (DBN), and a deep Q-network, and can be applied to fields such as computer vision, voice recognition, natural language processing, and voice/signal processing.

Meanwhile, a processor that performs the functions described above may be a general purpose processor (e.g., a CPU), but may be an AI-only processor (e.g., a GPU) for artificial intelligence learning.

The memory 25 can store various programs and data for the operation of the AI device 20. The memory 25 may be a nonvolatile memory, a volatile memory, a flash-memory, a hard disk drive (HDD), a solid state drive (SDD), or the like. The memory 25 is accessed by the AI processor 21 and reading-out/recording/correcting/deleting/updating, etc. of data by the AI processor 21 can be performed. Further, the memory 25 can store a neural network model (e.g., a deep learning model 26) generated through a learning algorithm for data classification/recognition according to an embodiment of the present invention.

Meanwhile, the AI processor 21 may include a data learning unit 22 that learns a neural network for data classification/recognition. The data learning unit 22 can learn references about what learning data are used and how to classify and recognize data using the learning data in order to determine data classification/recognition. The data learning unit 22 can learn a deep learning model by acquiring learning data to be used for learning and by applying the acquired learning data to the deep learning model.

The data learning unit 22 may be manufactured in the type of at least one hardware chip and mounted on the AI device 20. For example, the data learning unit 22 may be manufactured in a hardware chip type only for artificial intelligence, and may be manufactured as a part of a general purpose processor (CPU) or a graphics processing unit (GPU) and mounted on the AI device 20. Further, the data learning unit 22 may be implemented as a software module. When the data leaning unit 22 is implemented as a software module (or a program module including instructions), the software module may be stored in non-transitory computer readable media that can be read through a computer. In this case, at least one software module may be provided by an OS (operating system) or may be provided by an application.

The data learning unit 22 may include a learning data acquiring unit 23 and a model learning unit 24.

The learning data acquiring unit 23 can acquire learning data required for a neural network model for classifying and recognizing data. For example, the learning data acquiring unit 23 can acquire, as learning data, vehicle data and/or sample data to be input to a neural network model.

The model learning unit 24 can perform learning such that a neural network model has a determination reference about how to classify predetermined data, using the acquired learning data. In this case, the model learning unit 24 can train a neural network model through supervised learning that uses at least some of learning data as a determination reference. Alternatively, the model learning data 24 can train a neural network model through unsupervised learning that finds out a determination reference by performing learning by itself using learning data without supervision. Further, the model learning unit 24 can train a neural network model through reinforcement learning using feedback about whether the result of situation determination according to learning is correct. Further, the model learning unit 24 can train a neural network model using a learning algorithm including error back-propagation or gradient decent.

When a neural network model is learned, the model learning unit 24 can store the learned neural network model in the memory. The model learning unit 24 may store the learned neural network model in the memory of a server connected with the AI device 20 through a wire or wireless network.

The data learning unit 22 may further include a learning data preprocessor (not shown) and a learning data selector (not shown) to improve the analysis result of a recognition model or reduce resources or time for generating a recognition model.

The learning data preprocessor can preprocess acquired data such that the acquired data can be used in learning for situation determination. For example, the learning data preprocessor can process acquired data in a predetermined format such that the model learning unit 24 can use learning data acquired for learning for image recognition.

Further, the learning data selector can select data for learning from the learning data acquired by the learning data acquiring unit 23 or the learning data preprocessed by the preprocessor. The selected learning data can be provided to the model learning unit 24. For example, the learning data selector can select only data for objects included in a specific area as learning data by detecting the specific area in an image acquired through a camera of a vehicle.

Further, the data learning unit 22 may further include a model estimator (not shown) to improve the analysis result of a neural network model.

The model estimator inputs estimation data to a neural network model, and when an analysis result output from the estimation data does not satisfy a predetermined reference, it can make the model learning unit 22 perform learning again. In this case, the estimation data may be data defined in advance for estimating a recognition model. For example, when the number or ratio of estimation data with an incorrect analysis result of the analysis result of a recognition model learned with respect to estimation data exceeds a predetermined threshold, the model estimator can estimate that a predetermined reference is not satisfied.

The communication unit 27 can transmit the AI processing result by the AI processor 21 to an external electronic device.

Here, the external electronic device may be defined as an autonomous vehicle. Further, the AI device 20 may be defined as another vehicle or a 5G network that communicates with the autonomous vehicle. Meanwhile, the AI device 20 may be implemented by being functionally embedded in an autonomous module included in a vehicle. Further, the 5G network may include a server or a module that performs control related to autonomous driving.

Meanwhile, the AI device 20 shown in FIG. 6 was functionally separately described into the AI processor 21, the memory 25, the communication unit 27, etc., but it should be noted that the aforementioned components may be integrated in one module and referred to as an AI module.

Figure 7:
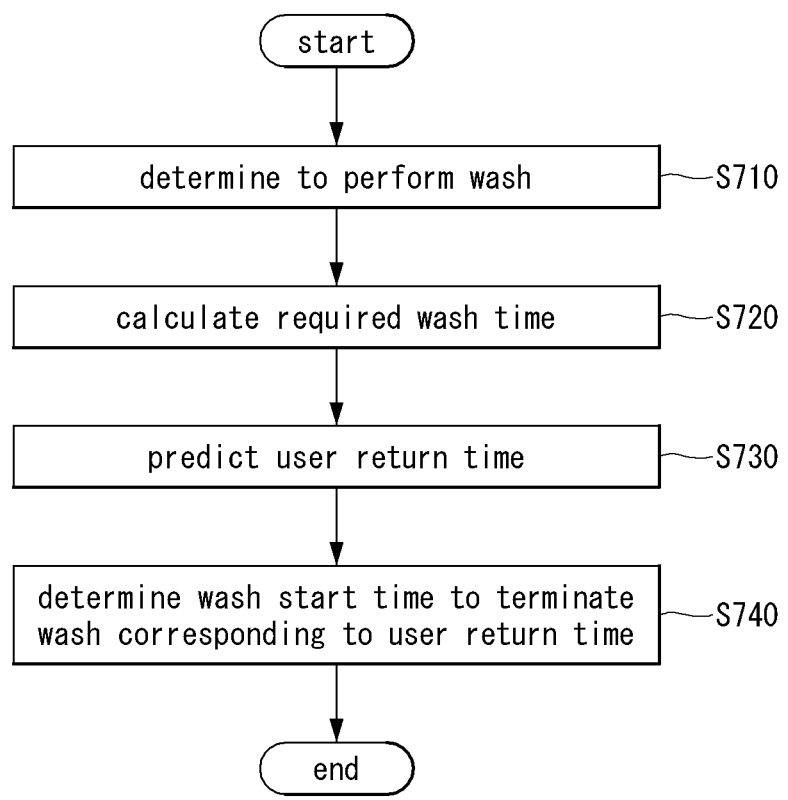
FIG. 7 is a flowchart illustrating a method of controlling wash timing according to an embodiment of the present invention.

FIG. 7 is a flowchart illustrating a method of controlling wash timing according to an embodiment of the present invention. FIG. 7 regards a method of controlling wash timing of a washer placed in a user space while the user is absent. The user space may correspond to the space where the washer is placed, e.g., the user's home.

Referring to FIG. 7, according to an embodiment, in a first step S710 of the wash timing control method, the controller 100 determines to perform a wash.

When the wash is determined to be performed, the controller 100 calculates a time required for the wash in a second step S720. The required time for the wash denotes a time interval from the time when the wash starts to the time when the wash ends or a time required to complete a series of cycles of wash-rinse-spin.

In a third step S730, the controller 100 predicts the user's return time. The return time denotes the time when the user returns home as repeated routinely, and an example thereof is the time when the user arrives home after leaving the work.

In a fourth step S740, the controller 100 determines the start time of the wash so that the wash terminates corresponding to the predicted return time. The controller 100 may determine the wash start time so that the wash end time is identical to the predicted return time. Alternatively, the controller 100 may determine the wash start time so that the wash end time is somewhat later than the return time according to the user's selection.

At least any one of the first step S710 to the fourth step S740 may be performed based on artificial intelligence (AI) learning.

Figure 8:
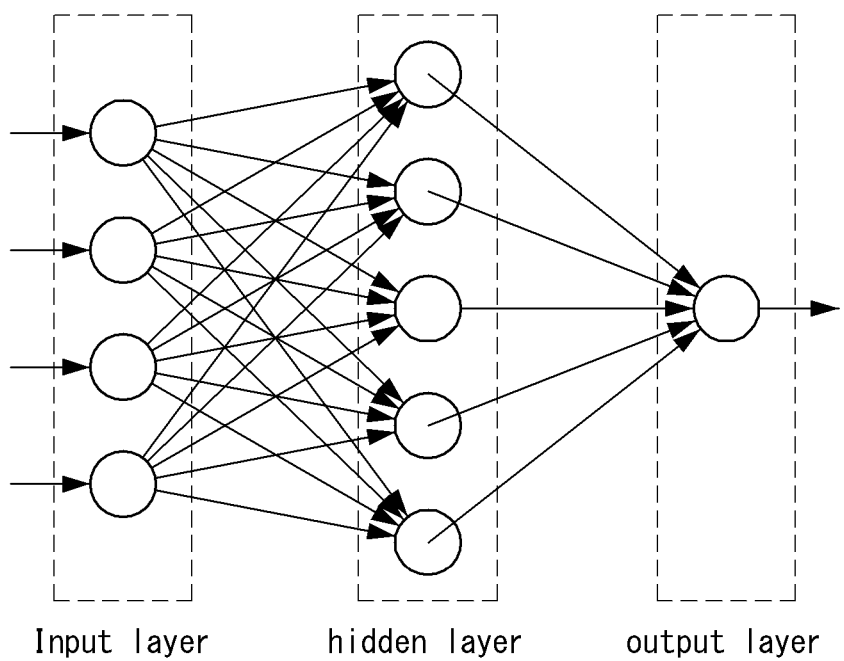
FIG. 8 is a view illustrating a timing prediction model for AI learning according to an embodiment of the present invention.

FIG. 8 is a view illustrating a timing prediction model for AI learning according to an embodiment of the present invention.

Referring to FIG. 8, the controller 100 may determine the control timing of the washer based on a timing prediction model.

The timing prediction model performs learning to elicit a particular output value according to an input value. The input value includes day information, time information, home personnel information, laundry information, or GPS information. The output value may be the required wash time or the user's return time. The output value may be the start time of the wash considering the required wash time and the return time.

A plurality of input values may be matched and used for learning. For example, particular day information may be matched with GPS information for the user and home personnel information according particular pieces of time information.

Figure 9:
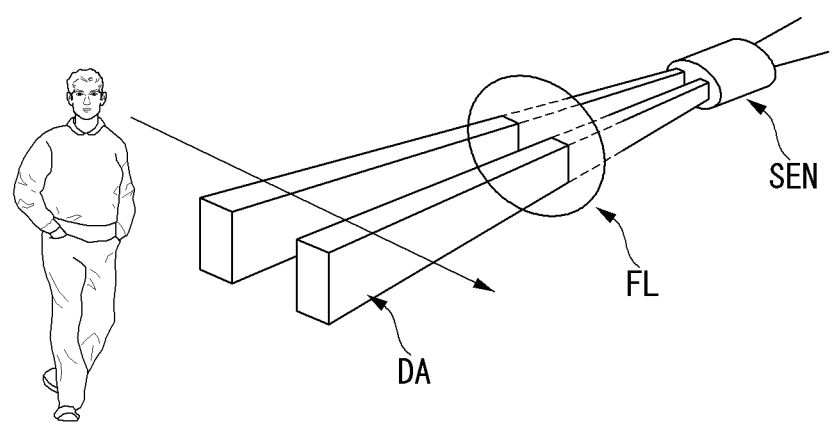
FIG. 9 is a view illustrating a PIR sensor.

The home personnel information may denote the number of people in the home and may be obtained by a passive infrared (PIR) sensor. The PIR sensor includes a sensor (SEN) that detects variations in infrared wavelength due to the radiation from the human body in a detection area (DA) as shown in FIG. 9. A Fresnel lens (FL) may widen the detection area DA and increase sensitivity. The controller 100 of the washer 10 may receive sensing results from the PIR sensor provided around the porch of the home and obtain personnel information based on the sensing results.

Each step of the wash timing control method is described below in greater detail.

Figure 10:
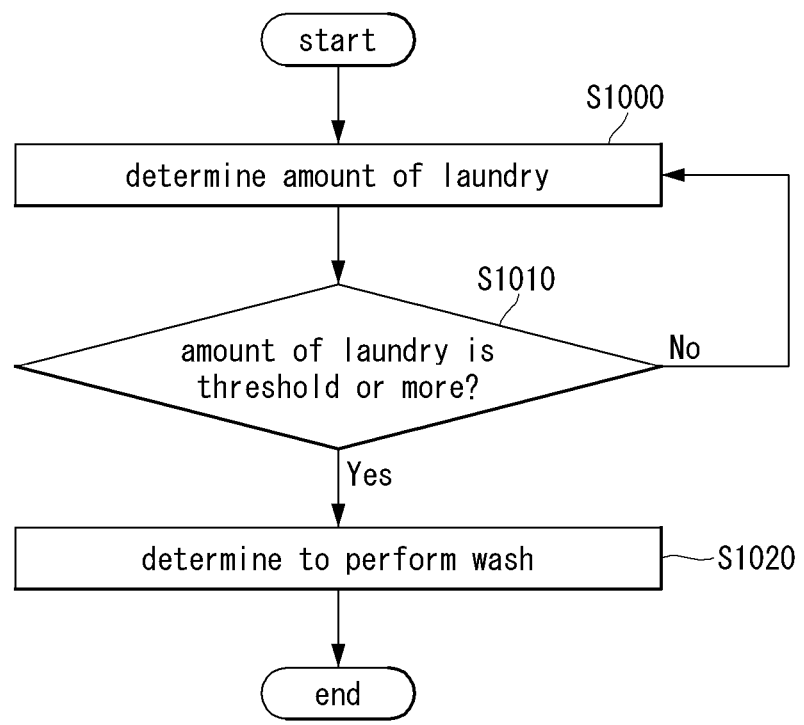
FIG. 10 is a flowchart illustrating a method of determining to perform a wash according to an embodiment of the present invention.

FIG. 10 is a flowchart illustrating a method of determining to perform a wash according to an embodiment of the present invention.

Referring to FIG. 10, in a first step S1000, the controller 100 detects the amount of laundry. The controller 100 may determine the amount of laundry seated in the washing tub 210 by analyzing an image obtained by a camera of the sensing device 250. The controller 100 may determine the amount of laundry seated in the washing tub 210 using a weight sensor of the sensing device 250.

In a second step S1010, the controller 100 determines whether the amount of laundry is a preset threshold or more. The threshold, as a reference for determining to perform a wash, may be set by the user or by the washer considering wash efficiency.

In a third step S1030, the controller 100 determines to perform a wash when the amount of laundry is the threshold or more.

Figure 11:
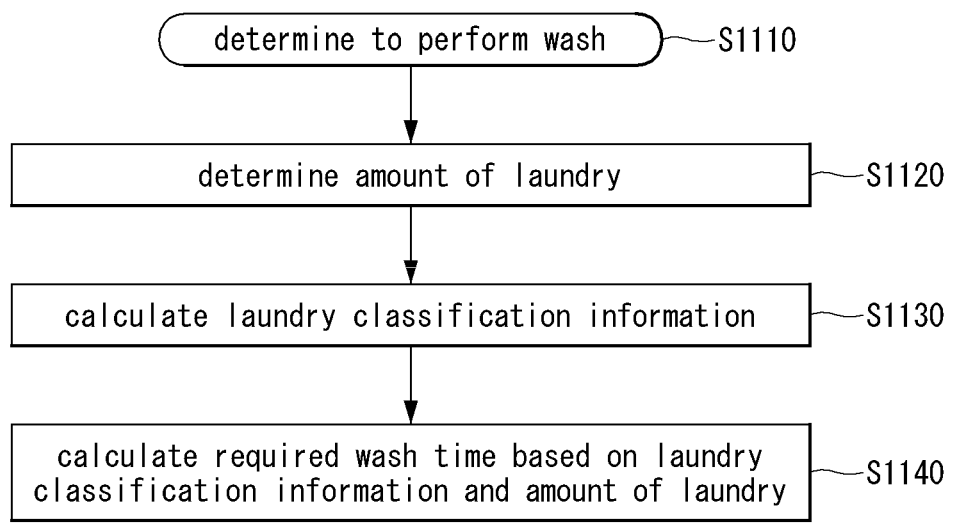
FIG. 11 is a flowchart illustrating an example of calculating a required wash time according to an embodiment of the present invention.

FIG. 11 is a flowchart illustrating an example of calculating a required wash time according to an embodiment of the present invention.

Referring to FIG. 11, in a first step S1110, a wash is determined to be performed. The same method as the first step S710 of FIG. 7 may be used to determine to perform a wash.

In a second step S1120, the controller 100 determines the amount of laundry. The second step S1120 may be performed in the same method as the first step S1000 of FIG. 10.

In a third step S1130, the controller 100 obtains laundry classification information for the laundry.

The laundry classification information denotes information for the kind or material of the laundry and may be classified based on factors that influence the laundry cycles and times. The controller 100 may obtain the laundry classification information by analyzing an image of the laundry obtained by the sensing device 250.

In a fourth step S1140, the controller 100 may calculate a required wash time based on the amount of laundry and the laundry classification information. For example, the controller 100 may calculate the required wash time in proportion to the amount of laundry. When the laundry is a delicate cloth, the controller 100 may control the motor 220 to run at low PRM while calculating a longer required wash time.

Figure 12:
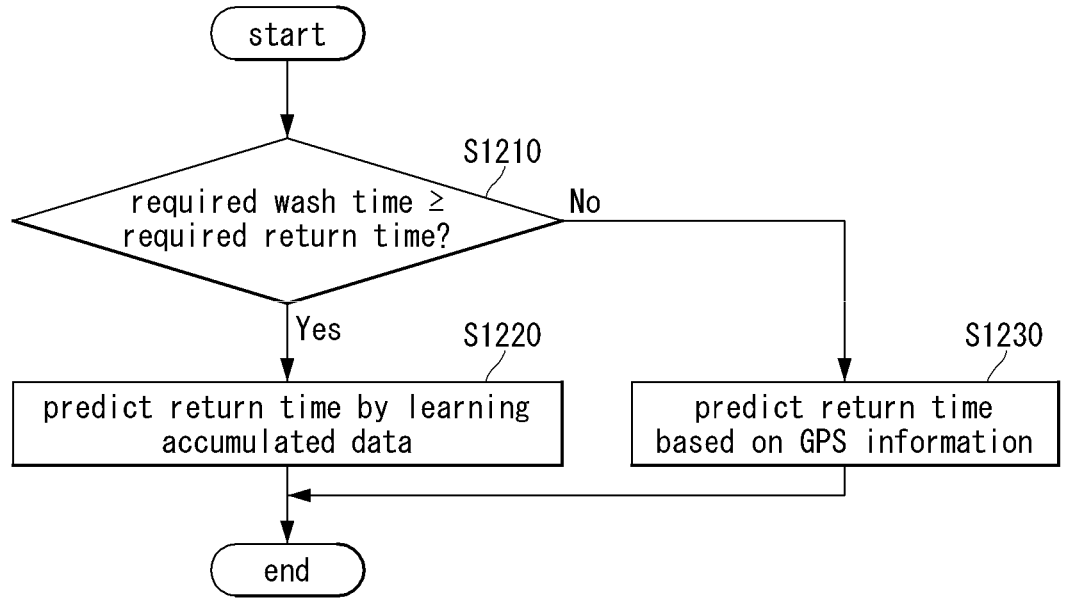
FIG. 12 is a flowchart illustrating a method of predicting a return time according to an embodiment of the present invention.

FIG. 12 is a flowchart illustrating a method of predicting a return time according to an embodiment of the present invention.

Referring to FIG. 12, in a first step S1210 of the return time prediction method, the controller 100 compares the required wash time with a required return time. The required return time means a required time between the time when the user leaves the work and the time when the user arrives home.

In a second step S1220, when the required wash time is longer than the required return time, the controller 100 predicts the return time by learning accumulated data. The accumulated data may be matches between day information and time information.

In a third step S1230, when the required wash time is shorter than the required return time, the controller 100 predicts the return time based on GPS information.

A method of predicting the return time based on GPS information is described below.

Figure 13:
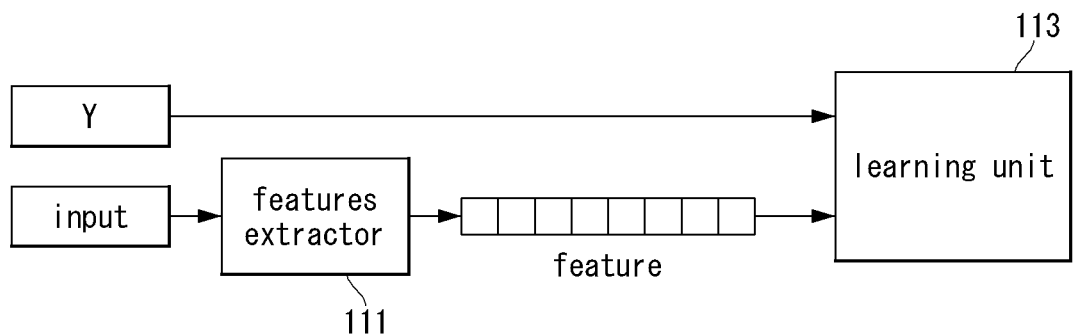
FIG. 13 is a view illustrating a configuration of a timing prediction model according to an embodiment of the present invention.

FIG. 13 is a view illustrating a configuration of a timing prediction model according to an embodiment of the present invention.

Referring to FIG. 13, a timing prediction model includes a features extractor 111 and a learning unit 113.

The features extractor 111 extracts features which are meaningful and do not overlap from an input value. The features extractor 111 is related to dimension reduction.

The learning unit 113 trains the extracted features to elicit a particular output value.

The learning unit 113 may use at least any one of a support vector machine (hereinafter, 'SVM'), K-nearest neighbor (hereinafter, 'KNN'), random_forest, stochastic gradient descent (hereinafter, 'SGD'), and neural network (hereinafter, 'NN').

The SVM denotes a machine learning algorithm to perform optimization to maximize the margin which is the distance between the train sample and the border surface which divides classes.

The KNN denotes an algorithm in which the input is constituted of k pieces of nearest training data in the feature space.

The random_forest is a sort of ensemble learning method used for classification or regression analysis and is a scheme for mean value prediction (regression analysis) or classification from multiple determination trees configured during the course of training.

The SGD is a type of method of obtaining the slope to minimize the differences between actual results and calculated results in gradient descent and denotes a method of reducing the loads of calculation by performing slope calculation only on some data in each step.

The NN is a structure adopted in the computer to address issues in a similar manner to resolving problems by the human brain.

To predict the return time based on the GPS information in the third step S1230 of FIG. 12, information shown in Table 1 below may be used as input values of the learning model.

TABLE 1

| Day | Time | GPS latitude | GPS longitude | home latitude | home longitude | T_1 | T_2 |
|---|---|---|---|---|---|---|---|
| Mon. | 17,05 | 37.471098 | 127.027541 | 37.469066 | 126.866463 | 70 | 75 |
| Mon. | 18,00 | 37.482098 | 126.927541 | 37.469066 | 126.866463 | | |
| Mon. | 18,30 | 37.469066 | 126.866463 | 37.469066 | 126.866463 | | |
| Tues. | 17,00 | 37.471098 | 127.027541 | 37.469066 | 126.866463 | 85 | 80 |
| Tues. | 18,00 | 37.482098 | 126.927541 | 37.469066 | 126.866463 | | |
| Tues. | 18,30 | 37.469066 | 126.866463 | 37.469066 | 126.866463 | | |

Referring to Table 1, input values for predicting the return time may include day information, time information, GPS information, and return time information T_1 and T_2.

The GPS information may include GPS latitude information and GPS longitude information for the user terminal indicating the user's location.

The return time information may include the return time T_1 which is based on real-time traffic information and the return time T_2 actually required.

The timing prediction model of FIG. 13 may predict the user's return time based on the input values as shown in Table 1 above.

The timing prediction model of FIG. 13 may also learn other output values than the return time. For example, the wash start time may be predicted based on the timing prediction model.

Table 2 below represents input values for predicting the wash start time.

TABLE 2

| Day | Time | personnel | laundry | GPS latitude | GPS longitude | home latitude | home longitude |
|---|---|---|---|---|---|---|---|
| Mon. | 1 | 4 | 5 | 37.469066 | 126.866463 | 37.469066 | 126.866463 |
| Mon. | 2 | 4 | 5 | 37.469066 | 126.866463 | 37.469066 | 126.866463 |
| Mon. | 3 | 4 | 5 | 37.469066 | 126.866463 | 37.469066 | 126.866463 |
| Mon. | 4 | 4 | 5 | 37.469066 | 126.866463 | 37.469066 | 126.866463 |
| Mon. | 5 | 4 | 5 | 37.469066 | 126.866463 | 37.469066 | 126.866463 |
| Mon. | 6 | 4 | 5 | 37.469066 | 126.866463 | 37.469066 | 126.866463 |
| ... | ... | ... | ... | . | ... | ... | ... |

Referring to Table 2 above, input values for predicting the wash start time may include day information, time information, personnel information, laundry information, and GPS information.

Figure 14:
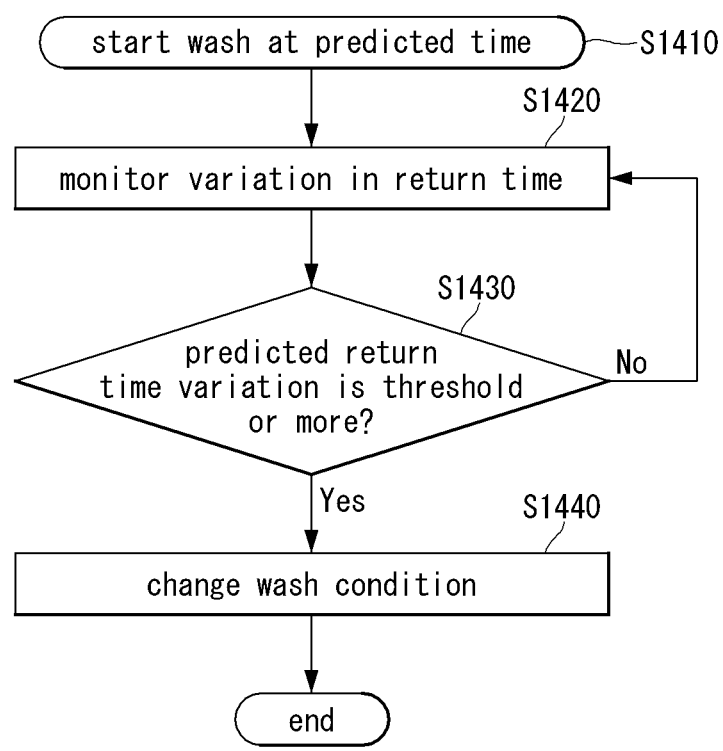
FIG. 14 is a flowchart illustrating a method of controlling a washer based on a wash timing prediction method according to an embodiment of the present invention.

FIG. 14 is a flowchart illustrating a method of controlling a washer based on a wash timing prediction method according to an embodiment of the present invention.

Referring to FIG. 14, in a first step S1410, a wash starts at a predicted time.

In a second step S1420, variations in the predicted return time are monitored.

The controller 100 may monitor the variations in the return time based on real-time GPS information for the user. The user's return time may be varied due to various factors while the user returns to the user space. The controller 100 may receive GPS information for the user in real-time and learn again the user's return time based on the GPS information in real-time.

In a third step S1430, the controller 100 compares a predicted return time variation with a preset threshold time.

In a fourth step S1440, the controller 100 changes the wash condition when the predicted return time variation is the preset threshold time or more. For example, when the threshold time is 10 minutes, if the predicted return time comes 10 minutes or more earlier or later, the controller 100 may change the wash condition.

As an example, the controller 100 may lengthen the rinse cycle when the predicted return time comes later. The controller 100 may shorten the rinse cycle when the predicted return time comes earlier.

Figure 15:
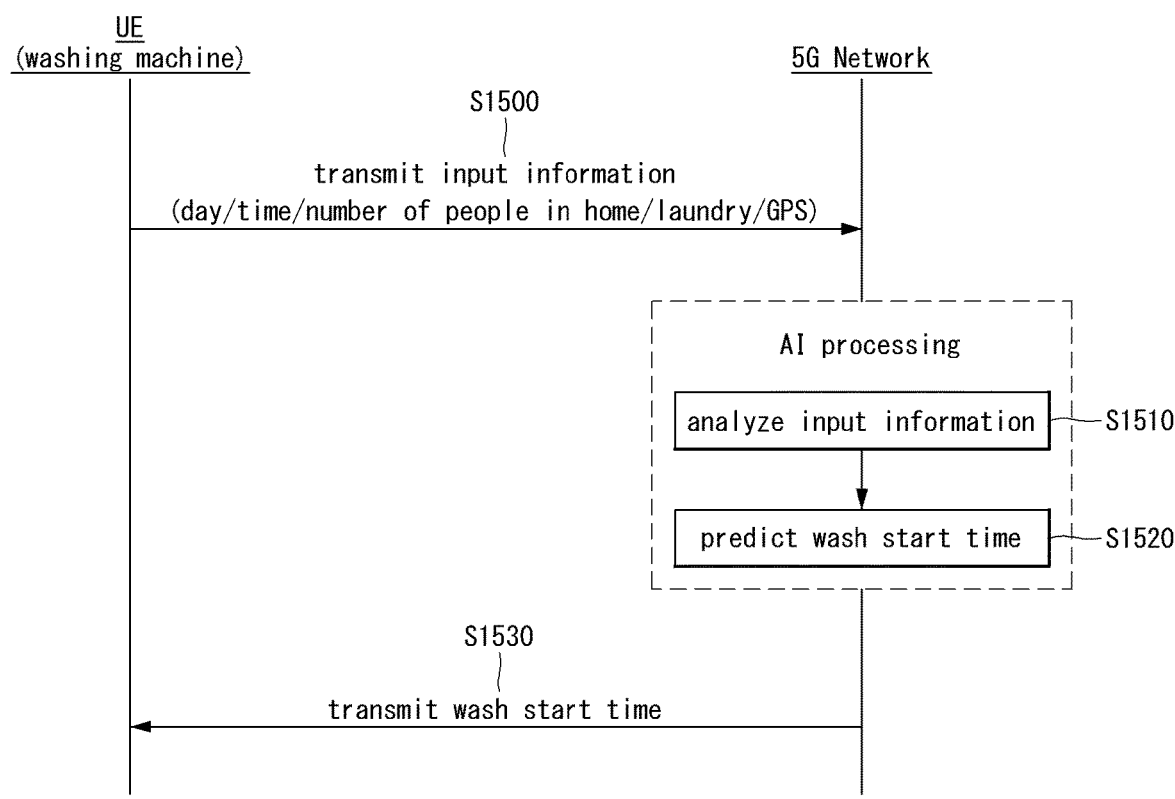
FIG. 15 is a view illustrating a method of controlling wash timing according to an embodiment of the present invention.

FIG. 15 is a view illustrating a method of controlling wash timing according to an embodiment of the present invention.

Referring to FIG. 15, the controller 100 may control the communication device 490 to transmit input information for the intelligent washer 10 to the AI processor included in the 5G network. The controller 100 may control the communication device 490 to receive AI-processed information from the AI processor. The AI-processed information may be predicted wash start time information.

The controller 100 may transmit the input information for the washer 10 to the network based on downlink control information (DCI) (S1500). The input information may be transmitted to the network via a physical uplink shared channel (PUSCH), and the DM-RSs of the synchronization signal block (SSB) and PUSCH may be quasi co-located (QCL) for QCL type D.

The 5G network may include an AI processor or an AI system, and the AI system of the 5G network may perform AI processing based on the received information.

The AI system may analyze the input information received from the washer 10 (S1510). The AI system may predict the wash start time based on the result of analysis of the input information (S1520).

The 5G network may transmit the predicted wash start time calculated by the AI system to the washer 10 via the wireless communication device (S1530).

EMBODIMENTS OF THE DISCLOSURE

Embodiment 1

A method of controlling wash timing of a washer placed in a user space when a user is absent comprises determining to perform a wash, calculating a required time for the wash, predicting a return time of the user, and determining a start time of the wash to terminate the wash corresponding to the return time.

Embodiment 2

In embodiment 1, the wash may be determined to be performed when an amount of laundry in the washer is a preset threshold or more.

Embodiment 3

In embodiment 2, calculating the required wash time may include determining the amount of laundry, obtaining laundry classification information for the laundry, and calculating the required wash time by learning the weight of the laundry and the laundry classification information.

Embodiment 4

In embodiment 1, predicting the return time may include comparing the required wash time with a required return time and predicting the return time by learning accumulated return times when the required wash time is longer than the required return time.

Embodiment 5

In embodiment 4, predicting the return time may include performing learning using real-time traffic information and global positioning system (GPS) information for the user as an input value of an artificial intelligence (AI) learning model when the required wash time is shorter than the required return time.

Embodiment 6

In embodiment 5, predicting the return time may include performing learning using the GPS information matching a particular time per day, as the input value of the AI learning model.

Embodiment 7

In embodiment 6, determining the wash start time may include performing learning using weight information for the laundry, the GPS information matching the particular time per day, and information for personnel in the user space, as the input value of the AI learning model.

Embodiment 8

In embodiment 7, the method may further comprise starting the wash at the determined wash start time, monitoring a variation in the predicted return time, and changing a wash condition when the variation in the predicted return time is a preset threshold or more.

Embodiment 9

In embodiment 8, changing the wash condition may include, when the predicted return time comes later, performing a rinse cycle for a longer time.

Embodiment 10

In embodiment 8, changing the wash condition may include, when the predicted return time comes earlier, performing a spin cycle for a shorter time.

Embodiment 11

In embodiment 7, determining the wash start time may include receiving, from a network, downlink control information (DCI) used for scheduling transmission of information for the input value of the AI learning model. The information for the input value of the AI learning model may be transmitted to the network based on the DCI.

Embodiment 12

In embodiment 11, the method may further comprise performing an initial access procedure with the network based on a synchronization signal block (SSB). The information for the input value of the AI learning model may be transmitted to the network via a physical uplink shared channel (PUSCH). Dedicated demodulation reference signals (DM-RSs) of the SSB and the PUSCH may be quasi co-located (QCL) for QCL type D.

Embodiment 13

According to an embodiment of the present invention, an intelligent washer comprises a washing tub receiving laundry, a motor driving the washing tub, and a controller calculating a required wash time and determining to perform a wash according to the amount of the laundry received in the washing tub, predicting a return time of a user who is absent, and determining a start time of the wash to terminate the wash based on the return time.

Embodiment 14

In embodiment 13, the controller may calculate the required wash time by learning the weight of the laundry and laundry classification information.

Embodiment 15

In embodiment 13, the controller may predict the return time by learning accumulated return times when the required wash time is longer than a required return time.

Embodiment 16

In embodiment 15, the controller may perform learning using real-time traffic information and GPS information for the user as an input value of an AI learning model when the required wash time is shorter than the required return time.

Embodiment 17

In embodiment 16, the controller may predict the return time by performing learning using the GPS information matching a particular time per day, as the input value of the AI learning model.

Embodiment 18

In embodiment 17, the controller may determine a wash start time by performing learning using weight information for the laundry, the GPS information matching the particular time per day, and information for personnel in a user space matching the particular time per day, as the input value of the AI learning model.

The above-described invention may be implemented in computer-readable code in program-recorded media. The computer-readable media include all types of recording devices storing data readable by a computer system. Example computer-readable media may include hard disk drives (HDDs), solid state disks (SSDs), silicon disk drives (SDDs), ROMs, RAMs, CD-ROMs, magnetic tapes, floppy disks, and/or optical data storage, and may be implemented in carrier waveforms (e.g., transmissions over the Internet). The foregoing detailed description should not be interpreted not as limiting but as exemplary in all aspects. The scope of the present invention should be defined by reasonable interpretation of the appended claims and all equivalents and changes thereto should fall within the scope of the invention.

The foregoing features, structures, or effects are included in, but not limited to, at least one embodiment of the present invention. The features, structures, or effects exemplified in each embodiment may be combined or modified by one of ordinary skill in the art in other embodiments. Thus, such combinations or modifications should be interpreted as belonging to the scope of the present invention.

While the present invention has been shown and described with reference to exemplary embodiments thereof, it will be apparent to those of ordinary skill in the art that various changes in form and detail may be made thereto without departing from the spirit and scope of the present invention as defined by the following claims. For example, each component in the embodiments may be modified. Such modifications and applications should be construed as included in the scope of the present invention as defined by the appended claims.

What is claimed is:

1. A method of controlling wash timing of a washer placed in a user space when a user is absent, the method comprising:
   determining to perform a wash;
   calculating a required wash time for the wash;
   predicting a return time of the user; and
   determining a wash start time of the wash to terminate the wash corresponding to the return time,
   wherein predicting the return time includes:
      comparing the required wash time with a required return time, and
      predicting the return time by learning accumulated return times when the required wash time is longer than the required return time.

2. The method of claim 1, wherein the wash is determined to be performed when an amount of laundry in the washer is a preset threshold or more.

3. The method of claim 2, wherein calculating the required wash time includes:
   determining the amount of laundry;
   obtaining laundry classification information for the laundry; and
   calculating the required wash time by learning the amount of the laundry and the laundry classification information.

4. The method of claim 1, wherein predicting the return time includes performing learning using real-time traffic information and global positioning system (GPS) information for the user as an input value of an artificial intelligence (AI) learning model when the required wash time is shorter than the required return time.

5. The method of claim 4, wherein predicting the return time includes performing learning using the GPS information matching a particular time per day, as the input value of the AI learning model.

6. The method of claim 5, wherein determining the wash start time includes performing learning using weight information of laundry, the GPS information matching the particular time per day, and information for personnel in the user space, as the input value of the AI learning model.

7. The method of claim 6, further comprising:
   starting the wash at the determined wash start time;
   monitoring a variation in the predicted return time; and
   changing a wash condition when the variation in the predicted return time is a preset threshold or more.

8. The method of claim 7, wherein changing the wash condition includes, when the predicted return time comes later, performing a rinse cycle for a longer time.

9. The method of claim 7, wherein changing the wash condition includes, when the predicted return time comes earlier, performing a spin cycle for a shorter time.

10. The method of claim 6, wherein determining the wash start time includes receiving, from a network, downlink control information (DCI) used for scheduling transmission of information for the input value of the AI learning model, and
    wherein the information for the input value of the AI learning model is transmitted to the network based on the DCI.

11. The method of claim 10, further comprising performing an initial access procedure with the network based on a synchronization signal block (SSB),
    wherein the information for the input value of the AI learning model is transmitted to the network via a physical uplink shared channel (PUSCH), and
    wherein dedicated demodulation reference signals (DM-RSs) of the SSB and the PUSCH are quasi co-located (QCL) for QCL type D.

* * * * *